(12) United States Patent
McLachlan et al.

(10) Patent No.: US 12,333,572 B2
(45) Date of Patent: Jun. 17, 2025

(54) JUST-IN-TIME USER DATA WITH PRIVACY

(71) Applicant: Telefonaktiebolaget LM Ericsson (PUBL), Stockholm (SE)

(72) Inventors: Paul McLachlan, San Francisco, CA (US); Héctor Caltenco, Oxie (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/778,756

(22) PCT Filed: Nov. 26, 2019

(86) PCT No.: PCT/IB2019/060191
§ 371 (c)(1),
(2) Date: May 20, 2022

(87) PCT Pub. No.: WO2021/105749
PCT Pub. Date: Jun. 3, 2021

(65) Prior Publication Data
US 2023/0027736 A1    Jan. 26, 2023

(51) Int. Cl.
  G06Q 30/0273  (2023.01)
  G06Q 30/0251  (2023.01)
  G06Q 30/08    (2012.01)

(52) U.S. Cl.
  CPC ..... G06Q 30/0275 (2013.01); G06Q 30/0261 (2013.01); G06Q 30/0271 (2013.01); G06Q 30/08 (2013.01)

(58) Field of Classification Search
  CPC .......... G06Q 30/0261; G06Q 30/0271; G06Q 30/0275; G06Q 30/08

USPC ................ 705/14.58, 14.67, 14.71
See application file for complete search history.

(56) References Cited

U.S. PATENT DOCUMENTS

| | | | |
|---|---|---|---|
| 5,963,371 A * | 10/1999 | Needham | G02B 30/25 359/464 |
| 8,930,990 B2 | 1/2015 | Slaney et al. | |
| 9,501,783 B2 | 11/2016 | Hood et al. | |
| 10,116,990 B2 | 10/2018 | Kamei et al. | |
| 11,232,490 B1 * | 1/2022 | Paran | G06Q 30/0275 |
| 2002/0062250 A1 | 5/2002 | Nagano et al. | |
| 2002/0165630 A1 * | 11/2002 | Arthur | A63F 13/35 700/91 |

(Continued)

OTHER PUBLICATIONS

Qayum et al., FenceBook a Geofencing based Advertisements Application Using Android, Advances in Science, Technology and Engineering Systems Journal, vol. 1, No. 5, pp. 27-33 (2016), DOI: 10.25046/aj010506, downloaded Aug. 4, 2023 (Year: 2016).*

(Continued)

*Primary Examiner* — Allan J Woodworth, II
(74) *Attorney, Agent, or Firm* — Baker Botts L.L.P.

(57) ABSTRACT

According to some embodiments, a method performed by an end user electronic device comprises: triggering a digital content display opportunity; generating an opportunity identifier that uniquely identifies the digital content display opportunity within a digital content display opportunity bidding system; obtaining demographic information associated with a user of the end user electronic device; and transmitting the opportunity identifier and the demographic information to a network node in the digital content display opportunity bidding system.

19 Claims, 15 Drawing Sheets

(56) References Cited

U.S. PATENT DOCUMENTS

| | | | |
|---|---|---|---|
| 2003/0144017 A1* | 7/2003 | Inselberg | A63F 13/12 455/517 |
| 2004/0073482 A1* | 4/2004 | Wiggins | G06Q 30/0252 705/14.66 |
| 2005/0165766 A1 | 7/2005 | Szabo | |
| 2008/0109317 A1* | 5/2008 | Singh | G06Q 30/0254 705/14.5 |
| 2014/0187269 A1* | 7/2014 | Zinin | H04W 4/029 455/456.3 |
| 2014/0379424 A1* | 12/2014 | Shroff | G06Q 30/0204 705/7.31 |
| 2015/0149542 A1* | 5/2015 | Jain | H04L 51/52 709/204 |
| 2015/0332329 A1* | 11/2015 | Luo | H04W 4/21 705/14.58 |
| 2016/0086215 A1 | 3/2016 | Wang et al. | |
| 2016/0142879 A1* | 5/2016 | Walden | H04W 12/64 455/456.3 |
| 2016/0269491 A1* | 9/2016 | Eom | G06T 11/001 |
| 2017/0222940 A1* | 8/2017 | O'Kelley | H04L 47/70 |
| 2017/0287010 A1* | 10/2017 | McKay | G06F 16/9535 |
| 2018/0041792 A1 | 2/2018 | Shkedi | |
| 2018/0349946 A1 | 12/2018 | Nguyen et al. | |
| 2019/0132815 A1* | 5/2019 | Zampini, II | G06Q 50/06 |
| 2019/0172099 A1 | 6/2019 | Soupliotis et al. | |
| 2019/0244436 A1* | 8/2019 | Stansell | G06Q 30/0643 |
| 2021/0036980 A1* | 2/2021 | Arasu | G06F 40/205 |

OTHER PUBLICATIONS

Scharmann, Anne, et al. "Advertising. com: mobile optimization and predictive segments" 2015 IEEE Systems and Information Engineering Design Symposium, pp. 80-84, downloaded Aug. 4, 2023 from https://ieeexplore.ieee.org/stamp/stamp.jsp?arnumber=7117016 (Year: 2015).*

Stemkoski, Ryan, ZiplineB2B.com, How to Geofence Advertising with Google, Facebook, Instagram and Snapchat, Zipline B2B Marketing, dated Oct. 15, 2019, downloaded from https://ziplineb2b.com/blog/how-to-geofence-advertising-with-google-facebook-instagram-and-snapchat/ on Aug. 4, 2023 (Year: 2019).*

"What is GPS", NASA, dated Jun. 3, 2019, downloaded Aug. 7, 2023 from https://www.nasa.gov/directorates/heo/scan/communications/policy/what_is_gps (Year: 2019).*

"What is a GPS? How does it work?", Library of Congress, dated Nov. 19, 2019, downloaded Aug. 7, 2023 from https://www.loc.gov/everyday-mysteries/technology/item/what-is-gps-how-does-it-work/ (Year: 2019).*

Rashmita Behera, What is a Demand-Side Platform (DSP)?, Ad Tech & Ad Ops, adpushup—Sep. 3, 2019.

Iab. Real Time Bidding (RTB) Project, OpenRTB API Specification Version 2.5, Final—Dec. 2016.

Iab. Tech Lab, OpenRTB 3.0 Framework, Launching Secure Supply Chain Standards, Draft for Public Comment—Sep. 2017.

PCT International Search Report issued for International application No. PCT/IB2019/060191—Sep. 23, 2020.

PCT Written Opinion of the International Searching Authority issued for International application No. PCT/IB2019/060191—Sep. 23, 2020.

* cited by examiner

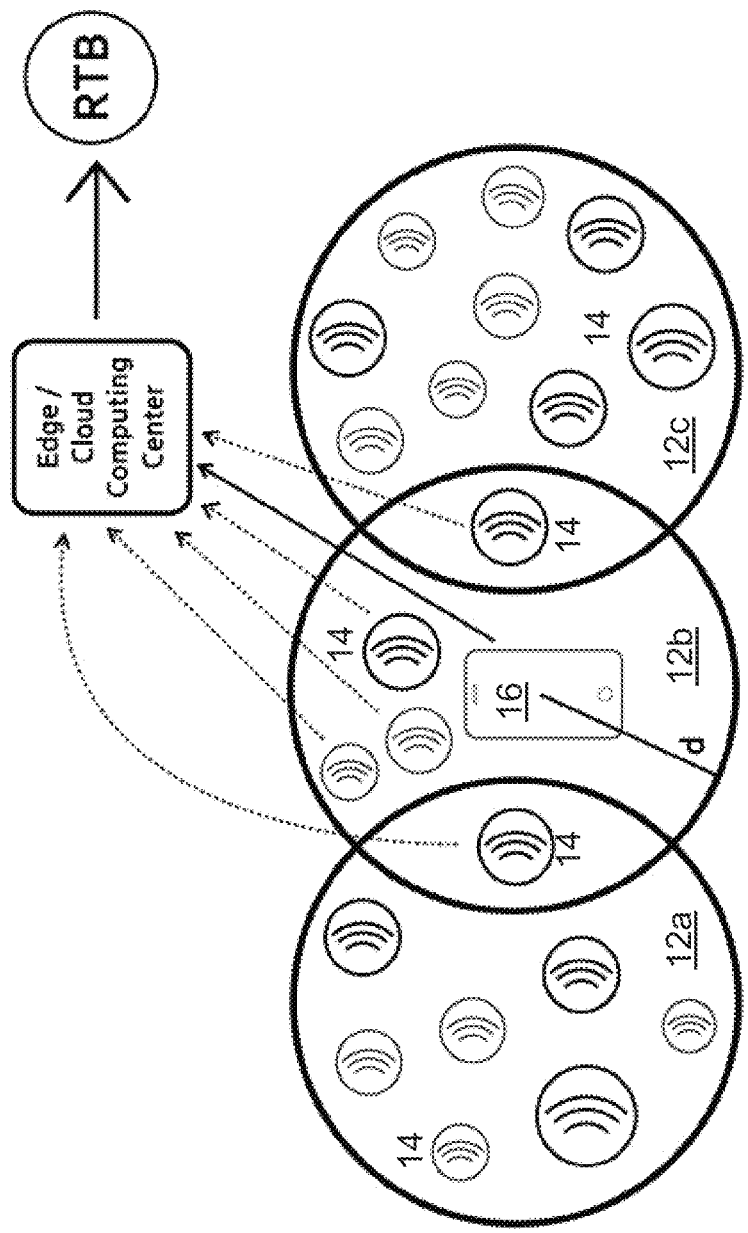

JUST-IN-TIME USER DATA WITH PRIVACY

PRIORITY

This nonprovisional application is a U.S. National Stage Filing under 35 U.S.C. § 371 of International Patent Application Serial No. PCT/IB2019/060191 filed Nov. 26, 2019 and entitled "JUST-IN-TIME USER DATA WITH PRIVACY" which is hereby incorporated by reference in its entirety.

TECHNICAL FIELD

Particular embodiments relate to electronic transmission of user data, and more specifically to enhanced privacy using real time transmission of user data.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Extended reality (XR) is an umbrella term referring to all real-and-virtual combined environments, such as augmented reality (AR), virtual reality (VR) and mixed reality (MR). XR refers to a wide variety and vast number of levels in the reality-virtuality continuum of the perceived environment, consolidating AR, VR, MR and other types of environments (e.g., augmented virtuality, mediated reality, etc.) under one term.

An XR device is the device used as an interface for the user to perceive both virtual and/or real content in the context of extended reality. An XR device typically has a display that may be opaque and displays both the environment (real or virtual) and virtual content together (i.e., video see-through) or overlay virtual content through a semi-transparent display (optical see-through). The XR device may acquire information about the environment through the use of sensors (typically cameras and inertial sensors) to map the environment while simultaneously tracking the device's location within the environment.

In some XR environments, opportunities for displaying digital content may be bought and sold. For example, advertising content may be bought and sold using real time bidding (RTB).

In non-XR environments, RTB is defined as a fully automated process that facilitates buying and selling of advertising inventory. In RTB, inventory may be sold per impression and priced via auction. The auctions determine who wins the right to place an advertisement in the opportunity. The winning bidder's advertisements are then displayed nearly instantaneously.

An advertisement is a piece of creative content designed to influence consumers' perceptions of brands or causes and/or cause them to engage in a set of calls to action.

A Supply-Side Platform (SSP) is a technology publishers use to manage advertisement inventory and receive advertisement revenue. A Demand-Side Platform (DSP) is a system that offers demand management to buyers/advertisers. Advertisers use a DSP to look for and buy inventory from the marketplace. Demand-side platforms may also manage real-time bidding for advertisers. They may send advertisers updates about upcoming auctions.

An advertisement server is a web server that stores digital advertisements. After an RTB auction is won, the advertisement server delivers the advertisement(s) to the user application, XR environment, or website. An impression is an advertisement that has been downloaded from an advertisement server and shown to a user.

A bid request is a request for an advertisement that is triggered when a user open a website, application, or other digital application that contains advertisement units. Each bid request contains parameters that define the inventory, such as the platform, the time of the impression, and a way to link the inventory to user data, such as an Internet protocol (IP) address, cookies, pixel tags, or ad IDs. The bid request is then transmitted into the real-time bidding ecosystem.

Advertisements may be tailored to particular users. A segment is a list of people who have taken particular actions, such as buying a vacuum cleaner within the past 30 days. An audience is a list of people who share certain behavioral, psychographical, demographics, and/or other traits. An example is impulsive shoppers with a net worth of $100,000 or above who live in California.

The click through rate is defined as the number of people who interact (e.g., click on) with a digital advertisement, divided by the number of impressions. The conversion rate is defined as the number of people who take a digital advertisement's call to action, divided by the number of click throughs.

Digital advertising, also known as programmatic advertising, emerged in the early 2000s to automate the process of buying and selling advertisements on popular websites. A problem with digital advertising is that it is not architected to integrate data from sensors, probes, or other Internet-of-Things (IoT) devices. These data are uniquely valuable for the creation and assignment of audiences, yet they are currently excluded from digital advertising.

FIG. 1 is a workflow diagram illustrating a programmatic advertising workflow. Addressability is a key innovation of digital advertising. In a fully personalized world, every user would see content that is tailored specifically and exclusively for them. Today, however, advertising works by assigning groups of people advertisers believe share similar interests, brand affinities, and purchasing power into groups known as segments or audiences. Demand-side platforms (DSPs) aggregate these segments and automate the process of selling advertisement.

While most advertisers have proprietary algorithms to assign users to their audiences(s), they share a common dependency: large amounts of historical data. Companies such as Google and Facebook record and store tremendous amounts of data regarding each user to improve the performance of their segment-generating algorithms. Because of the amount of data available for each user, and limitations with wireless networks, such as fourth generation (4G)/long term evolution (LTE), processing data at that scale in real time over a mobile network, audience assignment is generally persistent and not updated on the fly.

Without access to vast amounts of behavioral, financial, and psychographic data, digital advertising as it is today would be hugely impractical. This creates a vast marketplace for data for the purposes of digital advertising, indexed around Ad-IDs.

FIG. 2 summarizes how a social media company might construct an audience using data from its partnerships. For example, the social media company may acquire data from various aggregators (e.g., Epsilon, Axiom, LiveRamp, Four-Square, etc.), indexed around an Ad-ID. The data may be merged with the social media company's proprietary data and used to assign the Ad-ID to an audience.

This is imprecise, because historical data is often unreliable, inaccurate, or no longer describes consumers' current needs and preferences. In addition, storing the user information is hugely invasive of privacy.

SUMMARY

Based on the description above, certain challenges currently exist with digital advertising. Certain aspects of the present disclosure and their embodiments may provide solutions to these or other challenges. Particular embodiments integrate real-time data and process the data in an edge or cloud computing environment to assign devices to audiences. For example, some embodiments may use Internet-of-Things (IoT) data to assign audiences in real time and then delete the underlying data. Particular embodiments may use high speed and low latency network connection, such as fifth generation (5G) or WiFi, combined with edge and/or cloud computing.

In general, particular embodiments ingest data from sensors, IoT devices, and probes near the end user and upload those data to an edge or cloud computing environment and used in the construction of digital advertising audiences. Some embodiments assign a unique identifier (e.g., to the data transmission, which may be used for real-time bidding (RTB). Some embodiments dynamically define which external IoT data may be used together with device data to generate 1AdID packet. The data may be processed at the edge or in the cloud such that the data are assigned to an audience within 200 milliseconds, per OpenRTB 3.0 specifications. Some embodiments delete the underlying data used for audience assignment and send a receipt confirming the deletion of the data, which protects user privacy.

According to some embodiments, a method performed by an end user electronic device comprises: triggering a digital content display opportunity; generating an opportunity identifier that uniquely identifies the digital content display opportunity within a digital content display opportunity bidding system; obtaining demographic information associated with a user of the end user electronic device; and transmitting the opportunity identifier and the demographic information to a network node in the digital content display opportunity bidding system.

In particular embodiments, the method further comprises receiving environmental information from sensors proximate the end user electronic device and transmitting the environmental information to the network node. The method may further comprise receiving an indication from the network node that the network node has deleted all user information associated with the opportunity identifier. The method may further comprise receiving digital content for display at the end user electronic device. The digital content is associated with the opportunity identifier.

In particular embodiments, triggering the digital content display opportunity comprises accessing an application or a website via the end user electronic device, or comprises the end user electronic device being physically located at a particular geographic location (e.g., upon entering a physical location).

In particular embodiments, the environmental information includes one or more of positioning information, orientation information, biometric information, weather information, light-level information, and sound-level information.

In particular embodiments, the method further comprises assigning an audience identifier to the opportunity identifier. The assigned audience identifier is based on at least one of the environmental information and the demographic information. The method further comprises transmitting the audience identifier to the network node in the digital content display opportunity bidding system.

In particular embodiments, the digital content display opportunity comprises an advertising opportunity, the opportunity identifier comprises an advertising identifier, and the network node comprises a real time bidding network node.

According to some embodiments, an end user electronic device comprises processing circuitry operable to perform any of the end user electronic device methods described above.

Also disclosed is a computer program product comprising a non-transitory computer readable medium storing computer readable program code, the computer readable program code operable, when executed by processing circuitry to perform any of the methods performed by the end user electronic device described above.

According to some embodiments, a method performed by a network node in a digital content display opportunity bidding system comprises: receiving, from a set of devices including an end user electronic device, a digital content display opportunity identifier and environmental information associated with the end user electronic device; assigning an audience identifier to the digital content display opportunity identifier. The assigned audience identifier is based on the received environmental information. The method further comprises transmitting a bid request. The bid request comprises the digital content display opportunity identifier and the audience identifier.

In particular embodiments, the method further comprises receiving, from the end user electronic device, demographic information associated with a user of the end user electronic device. The assigned audience identifier is further based on the demographic information. The method may further comprise deleting all user information associated with the digital content display opportunity identifier and transmitting an indication to the end user electronic device that all user information associated with the digital content display opportunity identifier is deleted.

In particular embodiments, the digital content display opportunity identifier is received from the end user electronic device and the environmental information is received from one or more sensors proximate the end user electronic device. The environmental information may include one or more of positioning information, orientation information, biometric information, weather information, light-level information, and sound-level information.

In particular embodiments, an elapsed time from receiving the digital content display opportunity identifier and assigning the audience identifier is less than 200 milliseconds.

In particular embodiments, the digital content display opportunity is on the end user electronic device.

In particular embodiments, the digital content display opportunity identifier comprises an advertising identifier, and the network node comprises a real time bidding network node. Transmitting the bid request may comprise transmitting the bid request using an OpenRTB application programming interface (API).

According to some embodiments, a network node in a digital content display opportunity bidding system comprises processing circuitry operable to perform any of the network node methods described above.

Certain embodiments may provide one or more of the following technical advantages. For example, particular embodiments break digital advertising's dependence upon historical data and solves the tradeoff between personalization and privacy. Particular embodiments assign users to audiences by: processing user data at the edge or in the cloud; using sensor, probe, and IoT data to enhance audiences; using machine learning and artificial intelligence (AI) to automate and continuously improve the audience generation process; using edge and/or cloud computing to speed up the real-time bidding process; discarding all user data used to assign a device to an audience; sending a receipt confirming deletion to the device; and generating single-use ad identifiers.

Particular embodiments use 5G, edge computing, and/or cloud computing to complete the RTB process faster than current solutions. The architecture is scalable using cloud and edge devices. Particular embodiments facilitate flexibility because audience assignment may be performed on an end user device, at the edge, or in the cloud. Aggregating IoT data into advertisement identifiers facilitates use of contextual information to improve audience generation.

BRIEF DESCRIPTION OF THE DRAWINGS

For a more complete understanding of the disclosed embodiments and their features and advantages, reference is now made to the following description, taken in conjunction with the accompanying drawings, in which:

FIGS. 7A and 7B illustrate an end user mobile device transitioning between multiple geo-fences, according to particular embodiments;

DETAILED DESCRIPTION

Figure 1:
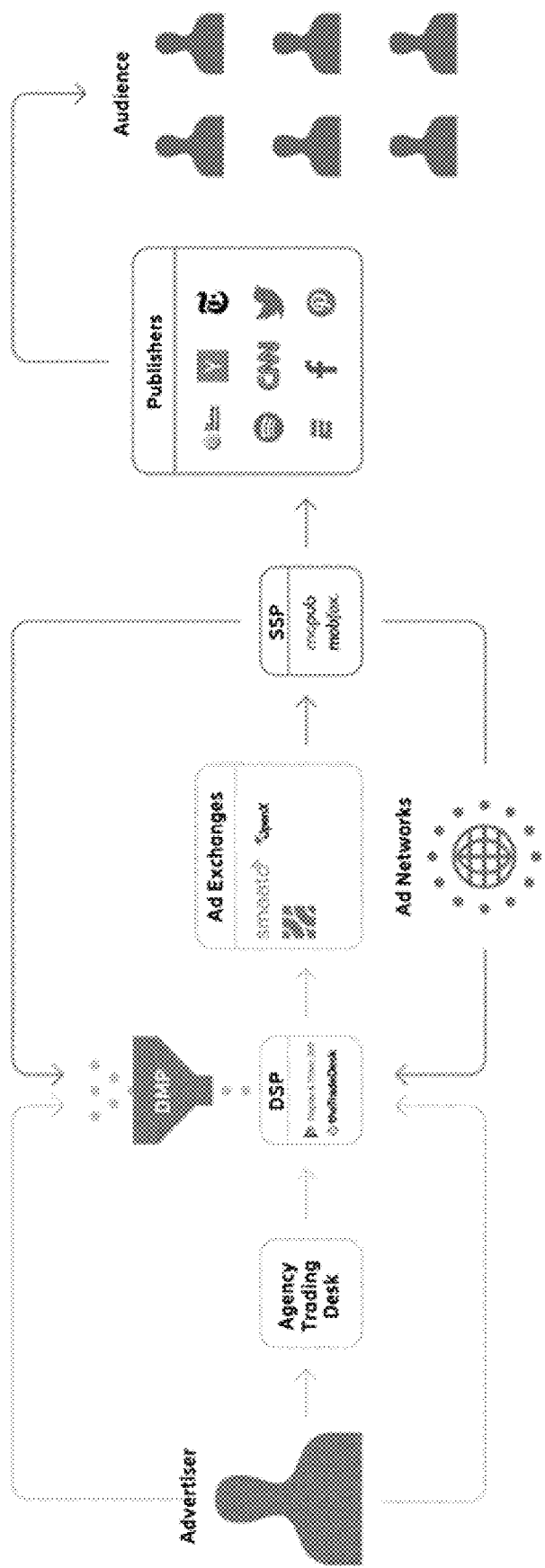
FIG. 1 (above) is a workflow diagram illustrating a programmatic advertising workflow.
Figure 2:
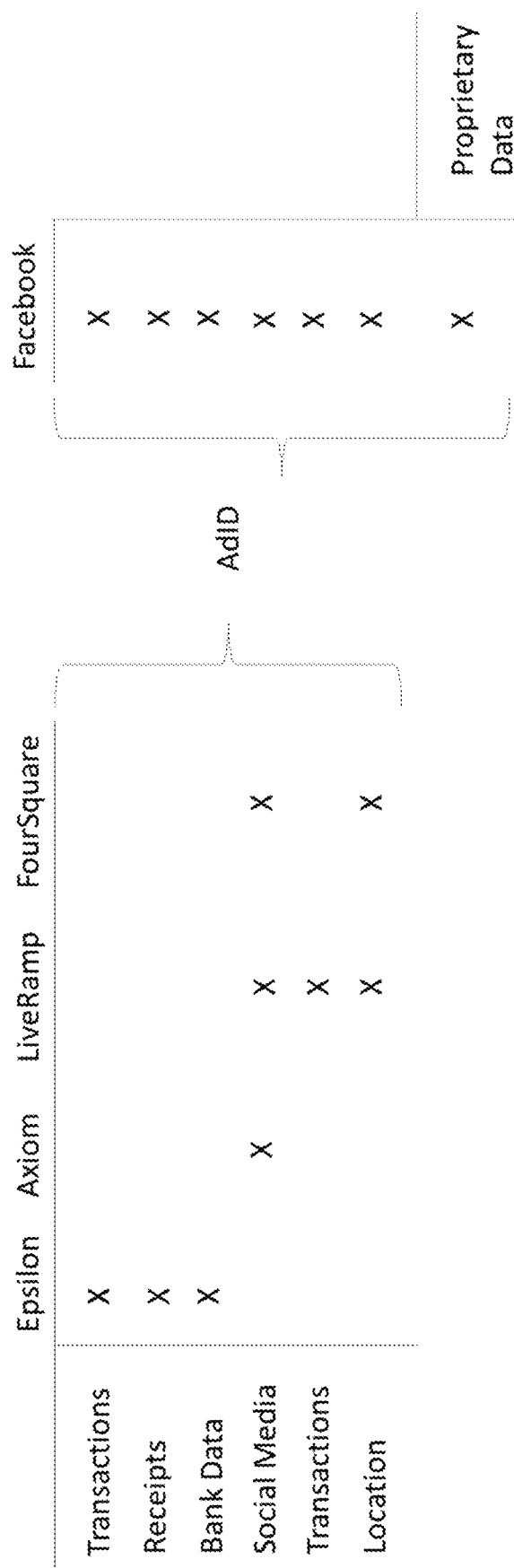
FIG. 2 (above) summarizes how a social media company might construct an audience using data from its partnerships.
Figure 3A:
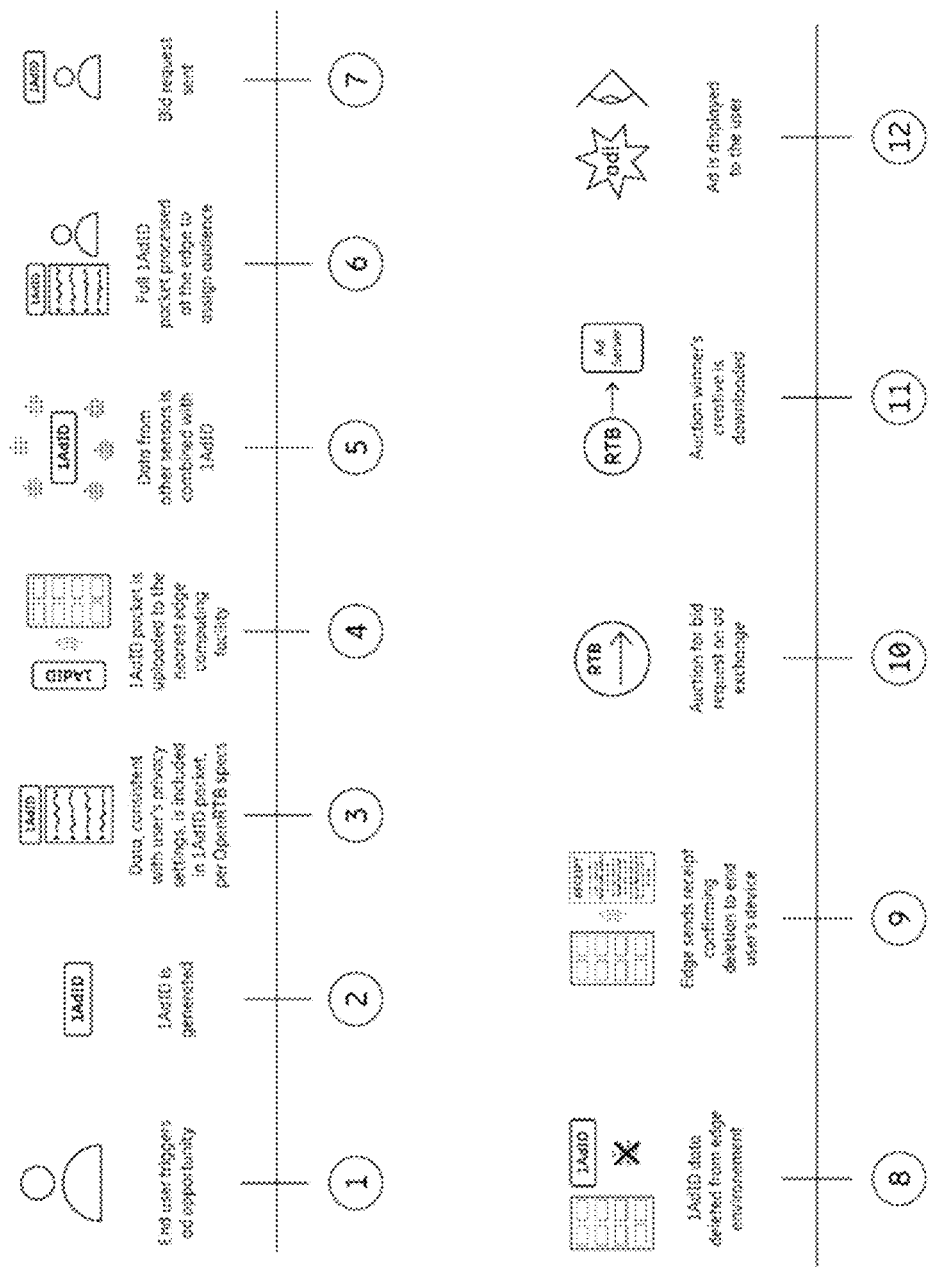
FIGS. 3A, 3B, 4A and 4B illustrate example multi-step processes for generating advertisements using just-in-time user data with privacy.
Figure 3B:
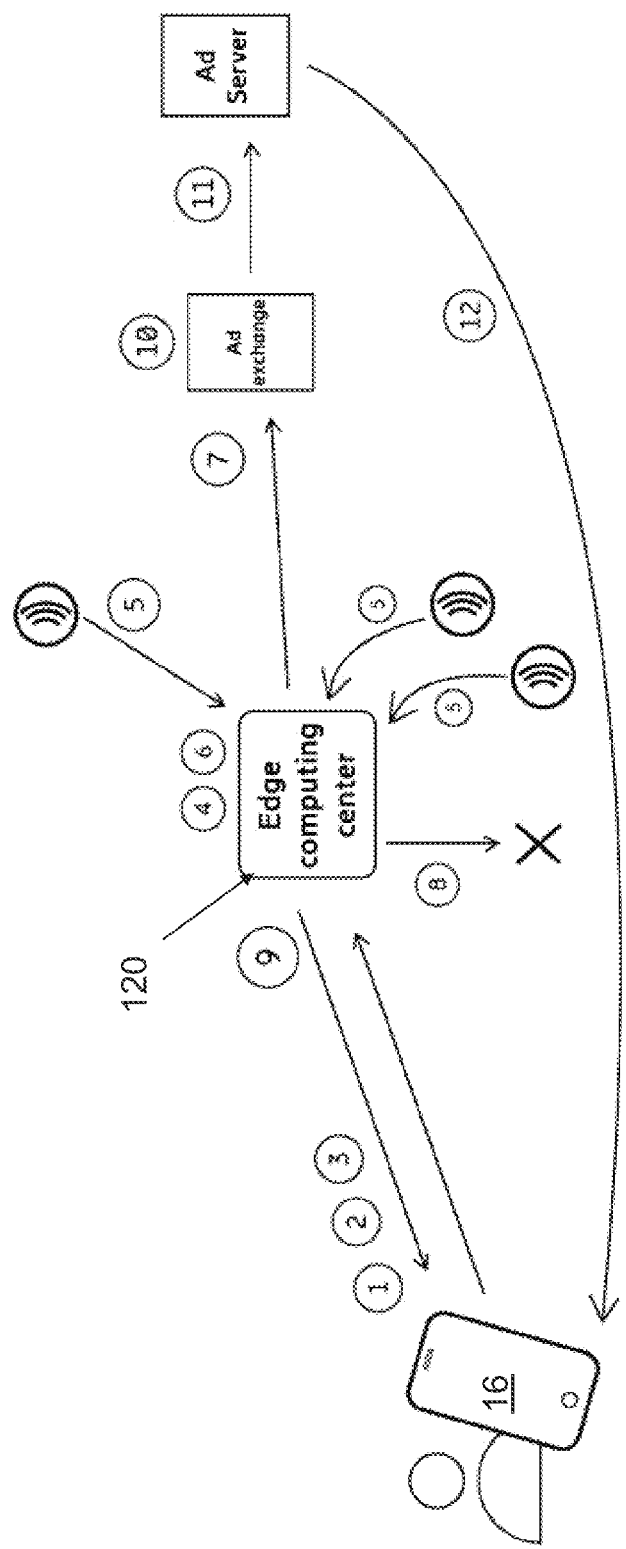
Figure 4A:
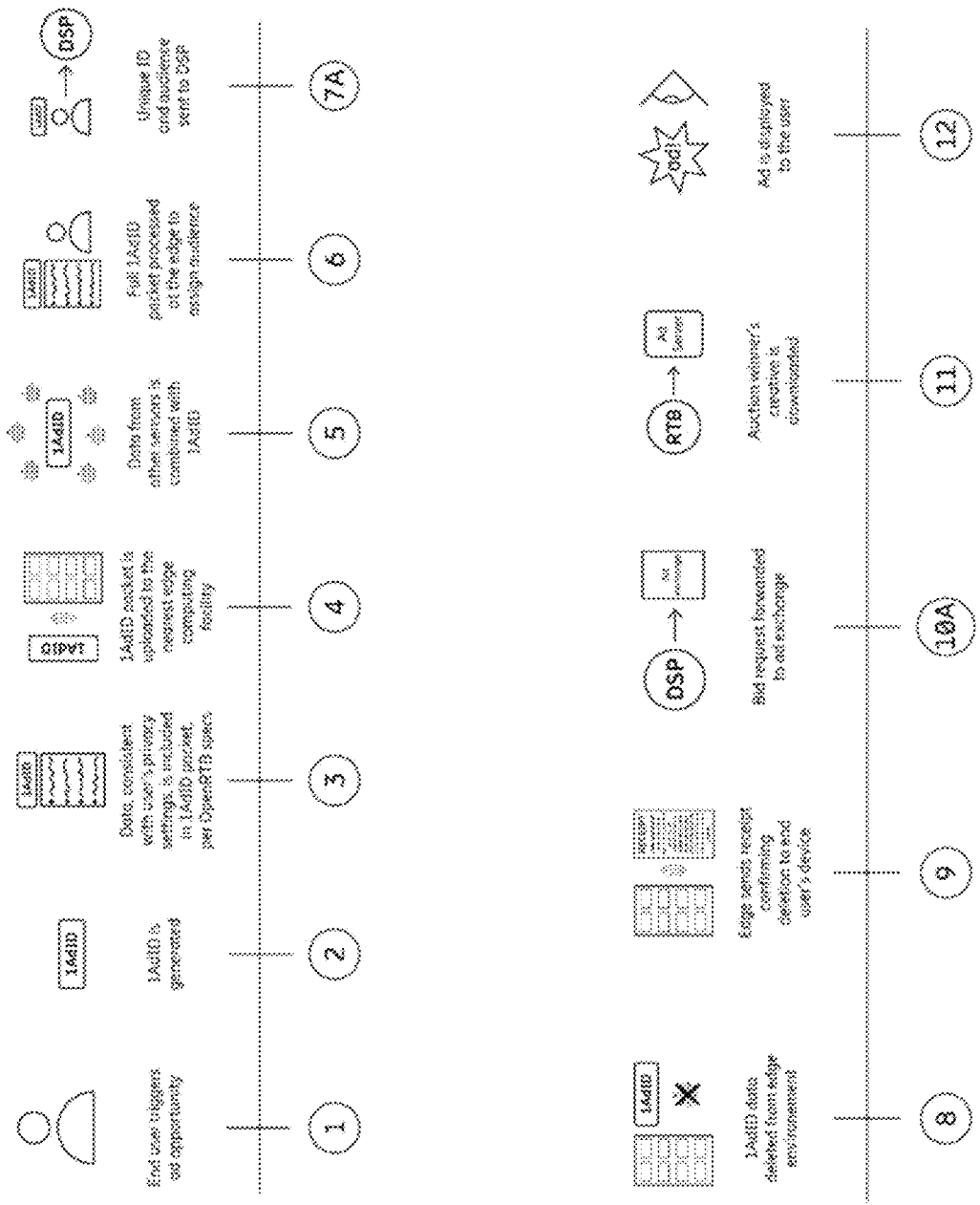
Figure 4B:
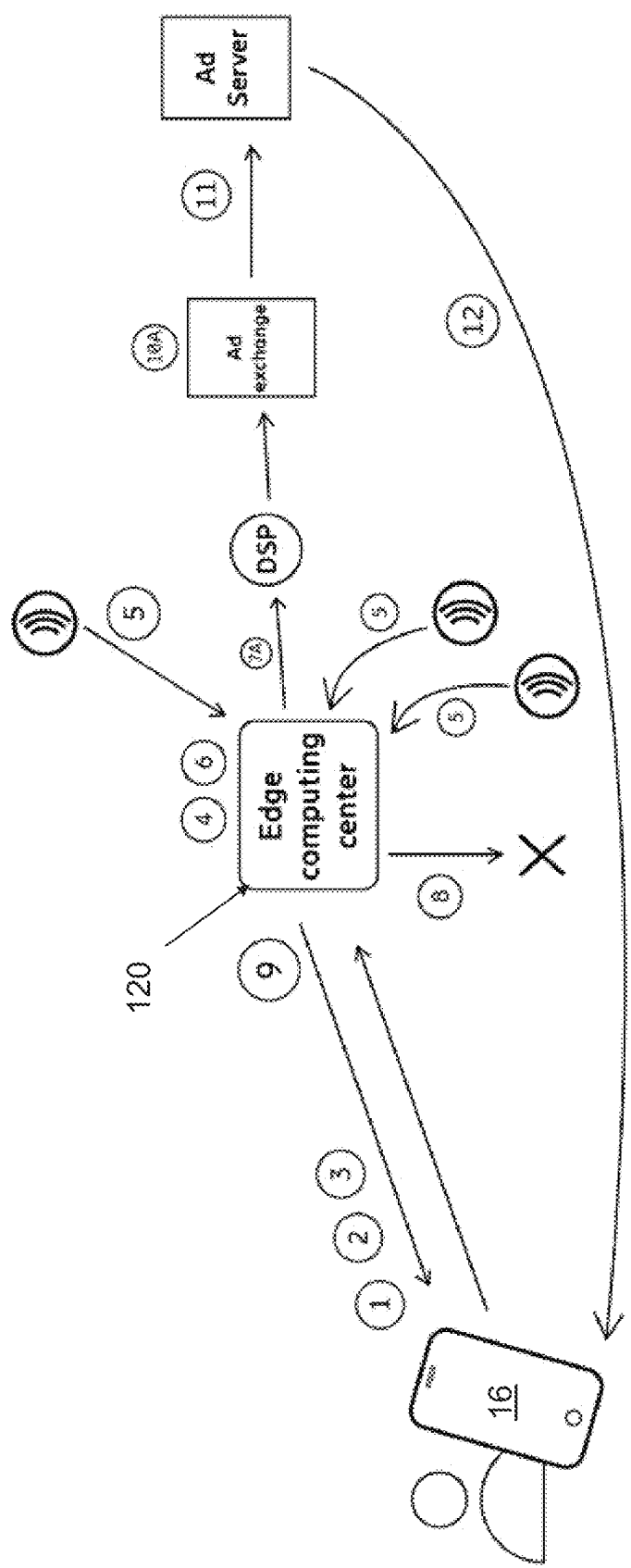

Digital advertising currently faces an existential threat. As described above, much of digital advertising's success rests on access to large repositories of historical user data. This poses a number of challenges for companies, not least of which is regulatory. Laws such as the European Union's General Data Protection Regulation (GDPR) and California's California Consumer Privacy Act (CCPA) create strict new consent-based limits on what can be done with user data and impose harsh financial penalties for companies found to have leaked data or for violations of user consent.

As described above, certain challenges currently exist with digital advertising. Certain aspects of the present disclosure and their embodiments may provide solutions to these or other challenges. An advantage of particular embodiments described herein is breaking digital advertising's dependence upon historical data, which solves the tradeoff between personalization and privacy. For example, particular embodiments gather data in real time for digital advertising. Some embodiments use machine learning and artificial intelligence in an edge or cloud computing environment to assign devices to audience(s). Particular embodiments delete the underlying data thereafter, addressing privacy concerns.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIGS. 3A, 3B, 4A and 4B illustrate example multi-step processes for generating advertisements using just-in-time user data with privacy. At step 1, an end user triggers an advertisement opportunity by, e.g., visiting or launching an application with opportunities to display advertisement, such as a website, application, or video game. In the case of extended reality (XR) advertising, the user enters a physical location. The physical location may be obtained via location services, which use global positioning system (GPS), Bluetooth, Wi-Fi or cellular (e.g., 5G) radio signals to estimate the location of the device. The device may be referred to herein as an end user electronic device.

Location accuracy can depend on the availability of different radio signals. Third Generation Partnership Project (3GPP) Release 16 may make high precision location services cheaper and more reliable via 5G. The combination of cellular-based and hybrid positioning location services can deliver both absolute and relative positioning. In addition to location information from the radio network, particular embodiments use inertial sensors in the end user's mobile, XR, or other device(s) to measure the pose (i.e., location and orientation) of the device.

At step 2, the user's device automatically generates a 1AdID that uniquely identifies the context (e.g., the device, visited application or physical location, etc.) and the relevant advertisement opportunities.

At step 3, the mobile or XR device appends real-time IoT and sensor data to the 1AdID from devices directly connected to the device, if the user has consented to data sharing for advertisement. Potential examples of such data to be included with the 1AdID include heartrate monitors, eye gaze trackers, wearable sensors, etc.

At step 3, end users may choose to include a standard packet of demographic information with their 1AdIDs. The packet may be controlled via an application on the user's 5G-connected device. The packet might include fields such as age, gender, and brand affinities.

At step 4, the 1AdID is then uploaded via long term evolution (LTE), WiFi, or 5G to, for example, the nearest edge or cloud computing facility.

At step 5, after the 1AdID packet reaches the edge or cloud computing facility, it is enriched by combining it with real-time data from sensors and probes located near the end user. This may be performed in parallel, in the edge or cloud computing environment. Examples of IoT data that might enrich the 1AdID include ambient temperature, light, sound, odors, proximity of people, or total number of nearby devices.

At step 6, the full 1AdID packet is processed at the edge or in the cloud to assign the end user to their relevant audience(s). The processing may be done using machine learning and artificial intelligence. The specific algorithm(s) used for assignment to audience can be proprietary to advertisers (e.g., unique to the advertising opportunity), mobile operators (e.g., unique to all AT&T customers), the physical location (e.g., unique to all visitors to an amusement park), or any permutation thereof.

The range of possible audiences can be defined qualitatively, using predefined, human-interpretable labels such as "business traveler" or "stay at home parent." They can also be assigned via AI, whereby the audiences may not have easily interpretable labels.

At step 7, after processing, the resulting audience, 1AdID, and bid request payload that identifies the device and corresponding opportunity is sent to an advertisement exchange as a bid request. Instead of sending the bid request directly to the advertisement exchange, some embodiments may send bid requests may to a demand side platform (DSP) first (e.g., step 7A in FIGS. 4A and 4B).

At step 8, the data used to generate the 1AdID is deleted from the edge or cloud environment.

At step 9, a receipt confirming the deletion of the data is sent to the end user's device. If the receipt cannot be sent to the device, the receipt may be purged from the server after a predefined number of milliseconds.

At step 10, an auction for the opportunity included in the 1AdID occurs. In embodiments that aggregate bid requests via a DSP, it is the DSP that sends the bid request to auction (step 10A in FIGS. 4A and 4B).

At step 11, the winning content from the auction in step 10 is downloaded from an advertisement server.

At step 12, the advertisement server sends the advertisement to the end user's device, where it is displayed.

In step 5 described above, data from sensors located in an arbitrary physical region nearby the device may be merged with data from the 1AdID to enrich it. The region may be defined through dynamically or statically generated geo-fences. Static geo-fences can be predefined by geo-fence operators and defined as boundaries such as shopping mall floors or areas of a store, city, etc. Dynamically generated geo-fences may be defined as a radius around a point or location, e.g., a circular area around the mobile device.

By definition, dynamically generated geo-fences require a flexible definition of the maximum distance at which data are integrated. Setting the distance too far may cause the 1AdID to be enriched with an overwhelming amount of data, while too short may include too little data. Maximum distance can be defined dynamically depending on the situation, such as availability of IoT data, indoor or outdoor locations, etc.

Figure 5:
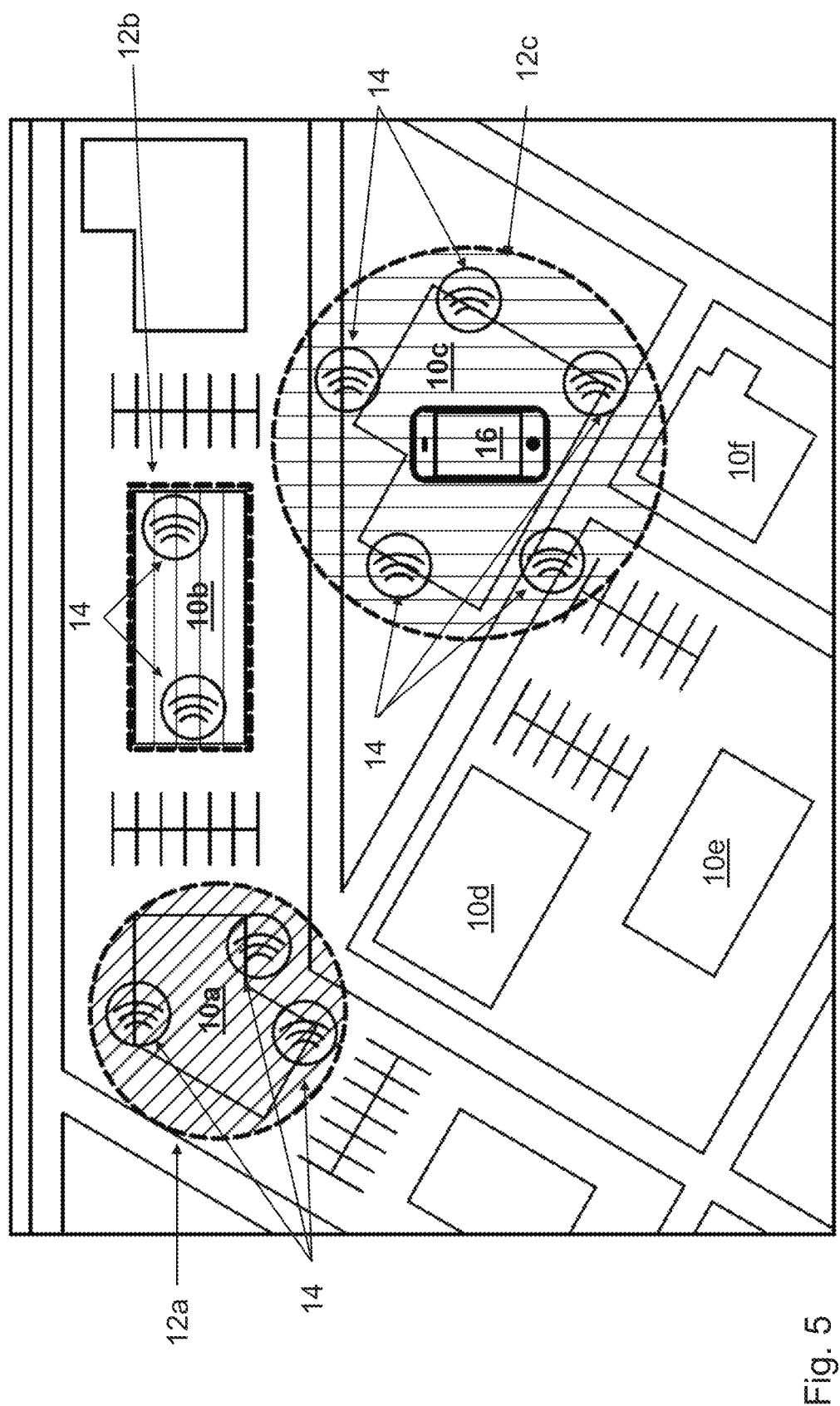
FIG. 5 is a map illustrating three static geo-fences at three office buildings, according to particular embodiments.

FIG. 5 is a map illustrating three static geo-fences at three office buildings, according to particular embodiments. The office campus includes several buildings 10. Buildings 10a, 10b, and 10c are within geo-fences 12a, 12b, and 12c, respectively. Within each geo-fence 12 are sensors 14. Sensors 14 may comprise IoT devices, probes, or any other suitable sensors. End user mobile device 16 is within building 10c and geo-fence 12c.

Data from geo-fence 12 belonging to the current location of end user mobile device 16 may be included in the 1AdID. Data from a different geo-fence 12 is excluded, even if some of the IoT devices are closer to the mobile device.

Figure 6:
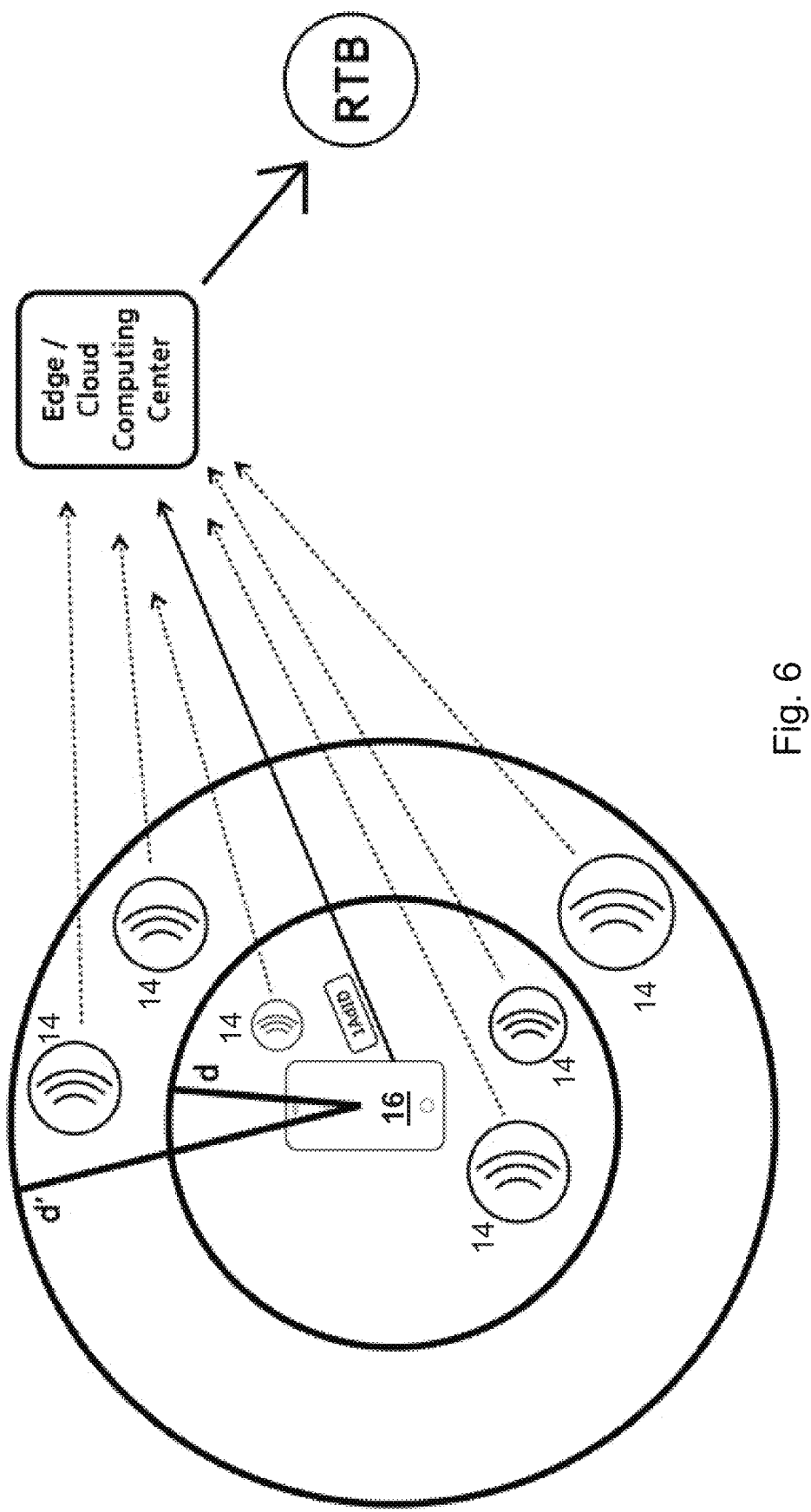
FIG. 6 illustrates an example dynamically generated geo-fence.

FIG. 6 illustrates an example dynamically generated geo-fence. End user mobile device 16 is at the center of the dynamic geo-fence. Sensors 14 located within an arbitrary physical distance from the end user mobile device 16 may be included in the 1AdID. When the distance parameter is set to d, only data from the three sensors 14 contained in the circle with d as a radius are included. When the distance parameter is set to d', three additional sensors 14 are included.

For static geo-fences, the set of possible sensors, probes, and IoT devices will update as end users travel within a space. When the mobile device transitions from one geo-fence to another, data from devices located within the new geo-fence will be included, and data from devices from the previous geo-fence will not be requested. If they are received by the edge or cloud computing center, they may be discarded and/or deleted. Devices from overlapping boundaries will continue to be included.

For dynamically generated geo-fences, the set of possible sensors, probes, and IoT devices may update as end users travel within a space. After setting a maximum allowed distance, d, data from devices located outside the maximum value of d will not be requested during the 1AdID generation process. If they are received by the edge or cloud computing center, they may be discarded and/or deleted. Example are illustrated in FIGS. 7A and 7B.

Figure 7B:
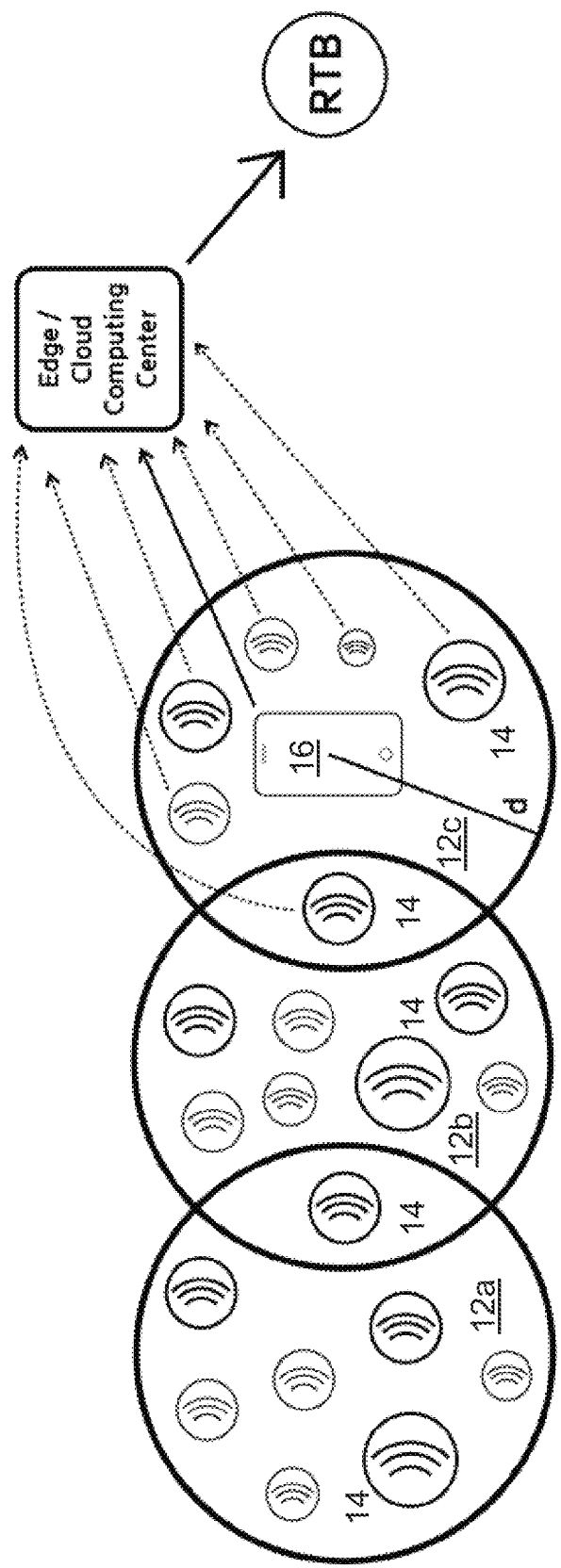

FIGS. 7A and 7B illustrate an end user mobile device transitioning between multiple geo-fences, according to particular embodiments. Geo-fences 12 may comprise static or dynamic geo-fences. Only data from sensors 14 located within the same geo-fence are included in the 1AdID packet. As end user mobile device 16 moves through space, the set of potential sensors 14 within the geo-fence also changes.

As described above, a geo-fence may be defined by a distance. One measure of distance is Minkowski distance, which is a generalization of both Euclidian and Manhattan distance. The Minkowski distance between points X and Y is defined as:

$$D(X, Y) = \left(\sum_{i=1}^{n} |x_i - y_i|^p\right)^{1/p}$$

In particular embodiments, the maximum distance allowed for calculation may be set as a general privacy setting by the end user, by the mobile operator, or be defined by custodians of facilities to separate different spaces.

Particular embodiments include an audience assignment module. The audience assignment module may use machine learning and/or artificial intelligence to optimize audience selection given the data contained in the 1AdID packet.

The inputs to the machine learning and/or artificial intelligence may include data from the end user's device(s) shared according to local privacy settings. If the user opts out of sharing their location, then location data will not be used in the 1AdID generation process. The option may also disactivate the inclusion of data from nearby sensors, probes, and IoT devices according to the end user's privacy settings. The inputs also include environmental data about the consumer's environment, gathered from IoT devices, sensors, and probes, which may be connected and located an arbitrary physical distance from the end user. The audience assignment process may include configured policies. For example, some embodiments may prioritize assignments to particular types of audiences.

The outputs from the machine learning and/or artificial intelligence may include a list of audience(s) assigned to each 1AdID. The list may include one audience or multiple, depending upon the underlying data. The RTB ecosystem makes the final decision about which advertisement is displayed where.

An example implementation may include a matching algorithm as described as follows. The input may comprise a list L of 1AdIDs with associated user and environmental data and a set N of initial candidates for audiences (subsets of L). The output includes a partition of L into a set of audiences. The algorithm may include the following example steps.

(1) Let N be a set of possible audiences (subsets of L).
(2) Let $n_i$ be a set of possible permutations of AI-defined audiences N.
(3) Let G be the empty graph.
(4) For each element $n_i$ of N:
    a. (3a) Add a node $n_i$ to G.
    b. For each node vertix $n_j$
        i. (3b) Connect $n_i$ to all node vertices if and only if it is a suitable audience, as determined by an oracle; otherwise, $n_i$ is left unconnected.
        ii. (3c) Assign a capacity of $c(n_i, n_j)$ to each edge $(n_i, n_j)$ and assign an existing flow $w(n_i, n_j) <= c(n_i, n_j)$.
(5) Add a source S that is connected out to each node in G by an edge with $c(S, n_i)$=infinity, $w(S, n_i)$=1, for all $n_i$ in G.
(6) Add a sink node T with edge $(n_i, T)$ for each node $n_i$ in G\S; the capacity of each edge should be $max(c(n_j, n_i))$.
(7) Solve for maximum flow, such as by applying the Ford-Fulkerson algorithm.
(8) Output the solved flow, which is the optimal audience choice. Flows should be non-negative, because there is no optimal solution for negative flows without DAGs.

The following are examples of collected data. The data are represented as Extensible Markup Language (XML) objects, but they could be represented as JavaScript Object Notation (JSON), or other formats. In the below example, the data sample comes from a female end user with a heartrate monitor entering a bookstore, which has a sound monitor installed.

IoT Data

```
message from='device@example.org'
    to='client @example.org/amr'>
  <fields xmlns='urn:xmpp:iot:sensordata' seqnr='1'
done='true'>
    <node nodeId='Device01'>
      <timestamp value='2019-03-07T16:24:30'>
        <numeric name='Heartrate' momentary='true'
automaticReadout='true' value='76' unit='BPM'/>
      </timestamp>
    </node>
  </fields>
</message>
```

Demographic Packet Data

```
message from='device@example.org'
    to='client@example.org/amr'>
  <fields xmlns='urn:xmpp:iot:sensordata' seqnr='1'
done='true'>
    <node nodeId='Device01'>
      <timestamp value='2019-03-07T16:24:30'>
        <numeric name='Gender' momentary='true'
automaticReadout='true' value='F' unit='Gender'/>
      </timestamp>
    </node>
  </fields>
</message>
```

Sensor Data

```
message from='device@example.org'
    to='client@example.org/amr'>
  <fields xmlns='urn:xmpp:iot:sensordata' seqnr='1'
done='true'>
    <node nodeId='Device01'>
      <timestamp value='2019-03-07T16:24:30'>
        <numeric name='Sound' momentary='true'
automaticReadout='true' value='87' unit='Decibels'/>
      </timestamp>
    </node>
  </fields>
</message>
```

Other than the consent process on the end user's mobile device to determine which data they will share; components of particular embodiments can be cloud-based. In some embodiments, cloud or edge computing may be used to fulfill the requirement that audience assignment take no more than 200 milliseconds (from uploading of data to assignment).

In the examples described above, the end user electronic device is typically a wireless device. The embodiments described herein also apply to wired devices. The following is a description of an example wireless network. End user electronic device 16 described above may include wireless device 110 described below.

Figure 8:
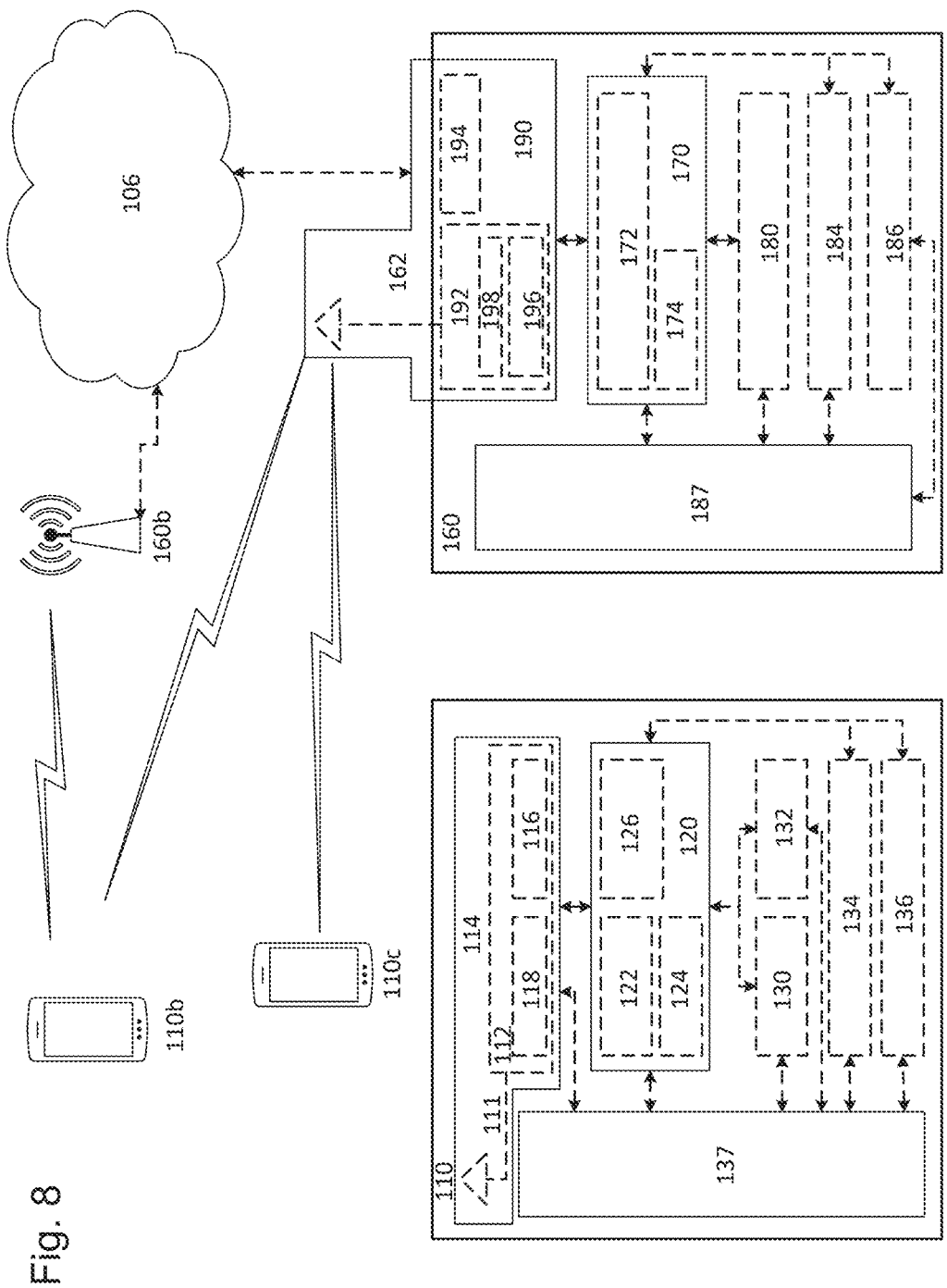
FIG. 8 illustrates an example wireless network, according to certain embodiments.

FIG. 8 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. Network nodes may also include edge and/or cloud devices.

A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 160 includes processing circuitry 170, device readable medium 180, interface 190, auxiliary equipment 184, power source 186, power circuitry 187, and antenna 162. Although network node 160 illustrated in the example wireless network of FIG. 8 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 8 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. A wireless device may also refer to a mobile terminal as part of an IAB node.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 9:
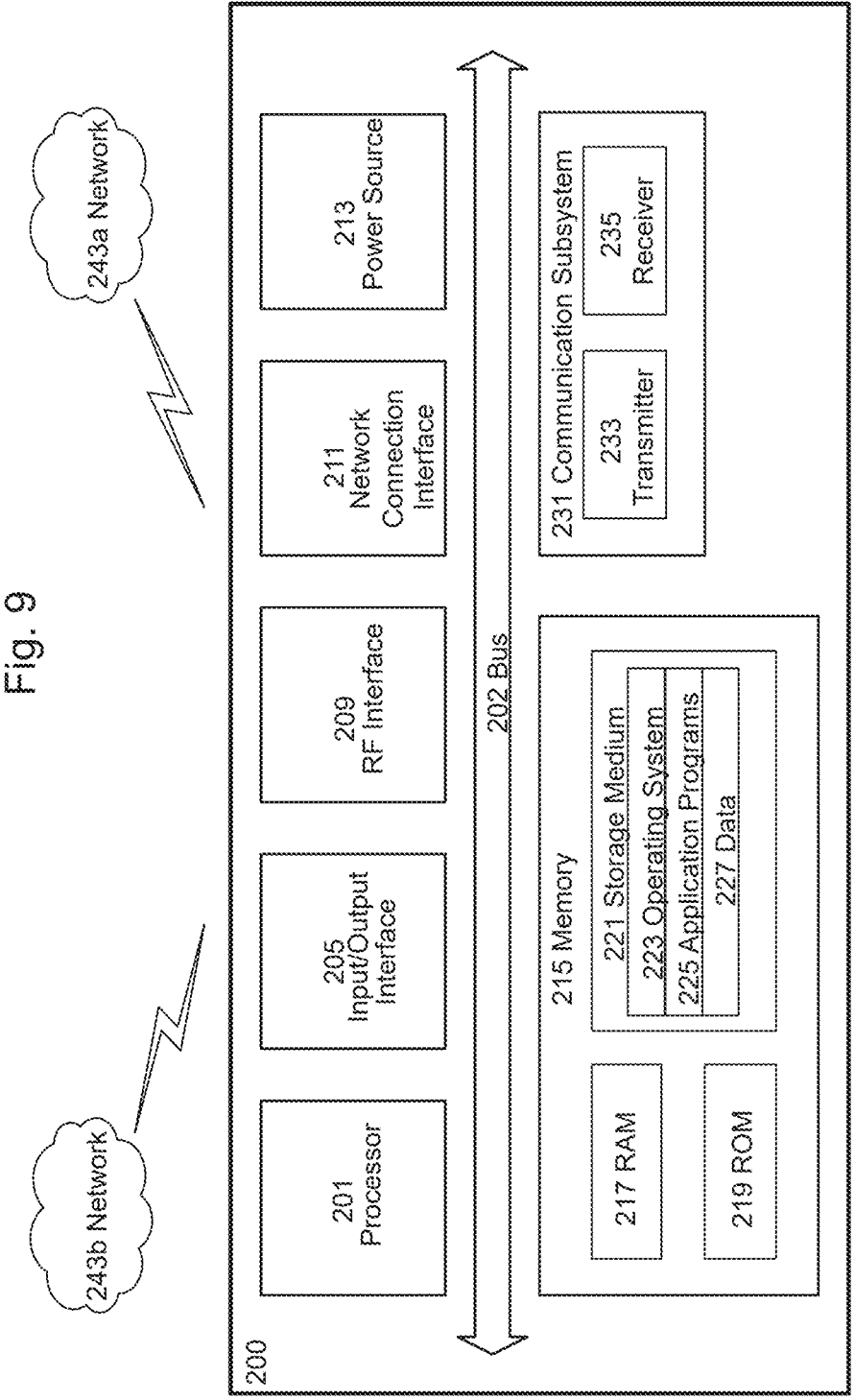
FIG. 9 illustrates an example user equipment, according to certain embodiments.

FIG. 9 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may use all the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 9, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 10:
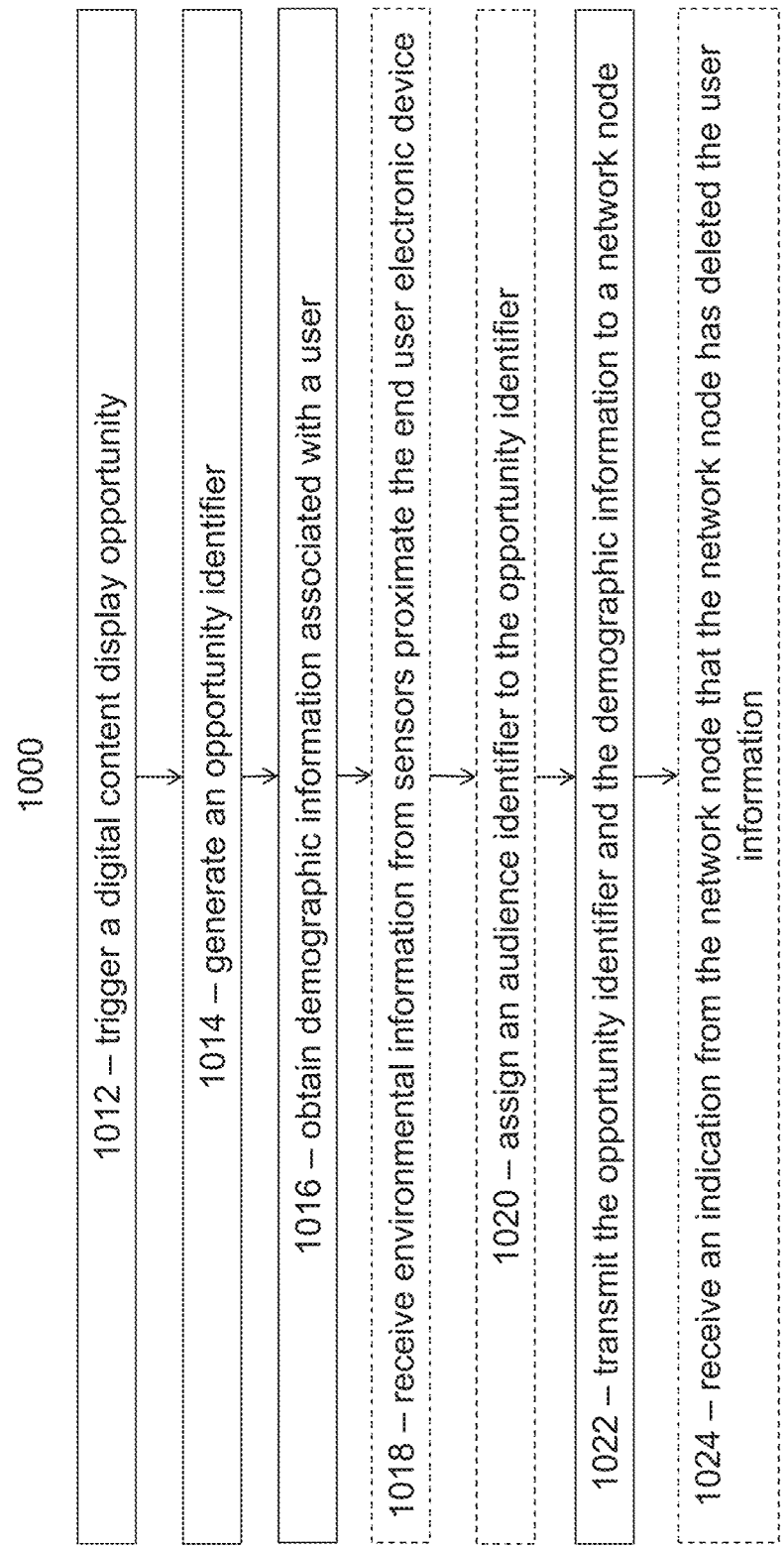
FIG. 10 is flowchart illustrating an example method in an end user electronic device, according to certain embodiments.

FIG. 10 is a flowchart illustrating an example method in an end user electronic device, according to certain embodiments. In particular embodiments, one or more steps of FIG. 10 may be performed by wireless device 110 described with respect to FIG. 8.

The method begins at step 1012, where the end user electronic device (e.g., wireless device 110) triggers a digital content display opportunity. For example, a user may access an application or a website via the end user electronic device to trigger an advertising opportunity. In some embodiments, a user may trigger an advertising opportunity by being physically located at a particular geographic location (e.g., entering a store or other physical location).

At step 1014 the end user electronic device generates an opportunity identifier that uniquely identifies the digital content display opportunity within a digital content display opportunity bidding system. For example, the end user electronic device may generate an advertisement identifier (e.g., 1AdID) that identifies an advertising opportunity in an advertising RTB system.

At step 1016, the end user electronic device obtains demographic information associated with a user of the end user electronic device. The demographic information may comprise metadata describing the user and/or the user's consumption patterns. As described above, the demographic information may comprise information about the user's age, gender, income, interests, etc. The demographic information may include brand affinities and prior purchase information. The demographic information may include any of the demographic, psychographic, and behavioural information described above.

A particular advantage of some embodiments is that the demographic information is stored on the end user electronic device. The end user may determine whether to share the information and what information to share. Thus, user privacy is improved.

At step 1018, the end user electronic device optionally receives environmental information from sensors proximate the end user electronic device. The sensors may include sensors or probes that are part of the end user electronic device (e.g., GPS for positioning information, gyroscopes for orientation information, etc.). The sensors may include sensors connected to the end user wireless device (e.g., heart rate monitor, fitness tracker, etc.). The sensors may include IoT sensors proximate the end user wireless device (e.g., temperature sensors, light level sensors, sound level sensors, etc.). As an example, the sensors may include sensors 14 described with respect to FIGS. 5-7B.

At step 1020, the end user electronic device may assign an audience identifier to the opportunity identifier. The assigned audience identifier is based on at least one of the environmental information and the demographic information. The audience identifier may be assigned based on ML or AI techniques, as described above (e.g., see FIGS. 3A-4B). In other embodiments, step 1020 may be performed at an edge or cloud device (see FIG. 11).

At step 1022, the end user electronic device transmits the opportunity identifier and the demographic information to a network node in the digital content display opportunity bidding system. For example, the end user electronic device may transmit an advertisement identifier and demographic information to an edge or cloud node in an advertising RTB. The edge or cloud node may use the demographic information to associate an audience identifier with the advertisement identifier as described above.

In some embodiments, the end user electronic device optionally also transmits environmental information to the edge or cloud node, which may use the environmental information to associate an audience identifier with the advertisement identifier as described above.

In embodiments where the end user electronic device assigns an audience identifier to the opportunity identifier, the end user electronic device may transmit the audience identifier to the network node (instead of the demographic and environment information). Whether to determine the audience identifier at the end user electronic device or at the network node involves a trade-off between data transmission and processing power. Determining the audience identifier at the end user electronic device reduces network traffic and increases data security, but the network node may have greater processing power for performing the ML or AI algorithms.

At step 1024, the end user electronic device optionally receives an indication from the network node that the network node has deleted all user information associated with the opportunity identifier.

Modifications, additions, or omissions may be made to method 1000 of FIG. 10. Additionally, one or more steps in the method of FIG. 10 may be performed in parallel or in any suitable order.

Figure 11:
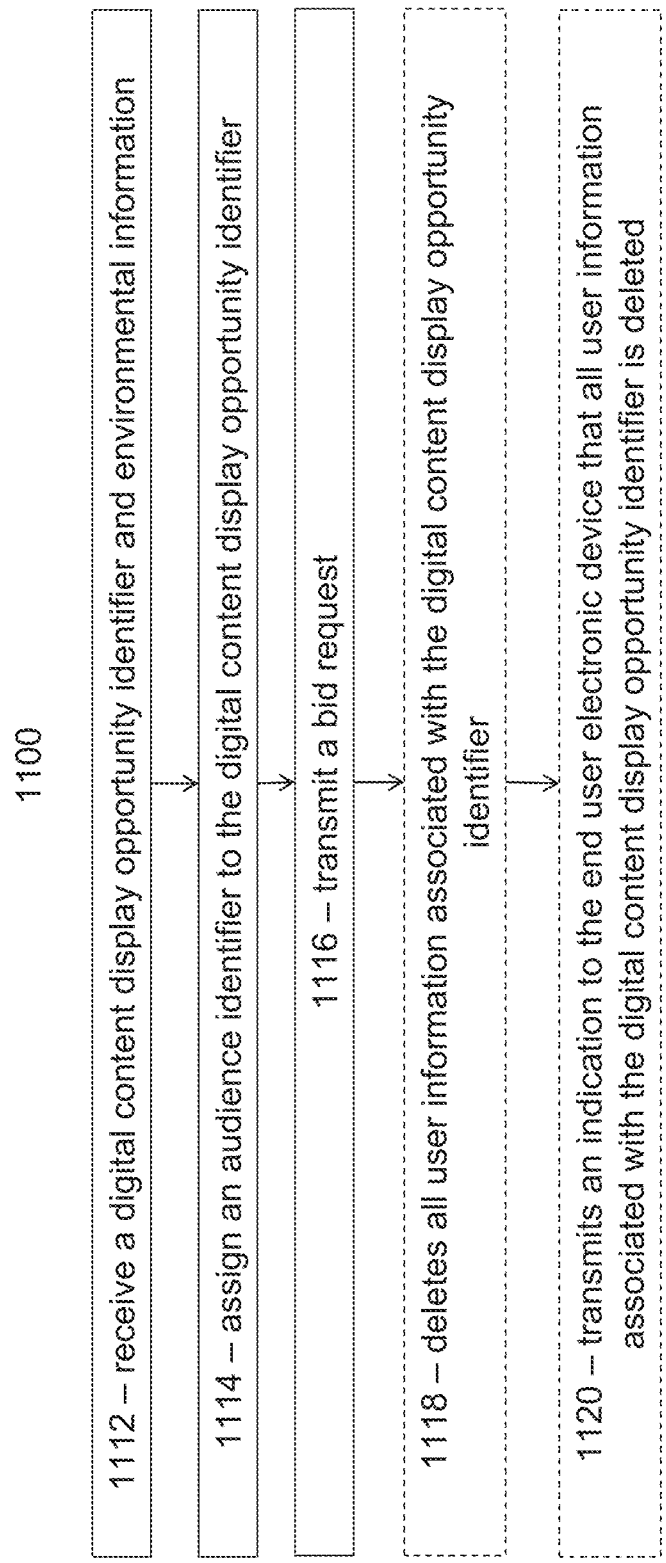
FIG. 11 is a flowchart illustrating an example method in a network node, according to certain embodiments.

FIG. 11 is a flowchart illustrating an example method in a network node, according to certain embodiments. In particular embodiments, one or more steps of FIG. 11 may be performed by network node 160 described with respect to FIG. 8. In some embodiments, the network node may comprise an edge node or a cloud node. The network node may be part of digital content display opportunity bidding system.

The method begins at step 1112, where the network node (e.g., network node 160) receives, from a set of devices including an end user electronic device, a digital content display opportunity identifier and environmental information associated with the end user electronic device. For example, the network node may receive an advertisement identifier (e.g., 1AdID) from an end user electronic device. The digital content display opportunity may be on the end user electronic device (e.g., an opportunity to display an advertisement on the end user electronic device).

The network node may also receive environmental information from sensors, such as sensors 14 described with respect to FIGS. 5-7B. The network node may determine what sensors are proximate the end user electronic device and use the environment information from those sensors. In some embodiments, the environmental includes one or more of positioning information, orientation information, biometric information, weather information, light-level information, and sound-level information.

Based on the received environmental information, at step 1114 the network node assigns an audience identifier to the digital content display opportunity identifier. The network node may use the environmental information to assign an audience identifier according to any of the embodiments and examples described above (e.g., see FIGS. 3A-4B).

In some embodiments, an elapsed time from receiving the digital content display opportunity identifier in step 1112 and assigning the audience identifier in step 1114 is less than 200 milliseconds.

At step 1116, the network node transmits a bid request. The bid request comprises the digital content display opportunity identifier and the audience identifier. For example, the network node may send an advertisement identifier and associated audience identifier to an advertising RTB system. The network node may transmit the bid request using an OpenRTB application programming interface (API).

At step 1118, the network node deletes all user information associated with the digital content display opportunity identifier. For example, the network node deletes any environmental and/or demographic information received from the end user electronic device to preserve the privacy of the end user.

At step 1120, the network node transmits an indication to the end user electronic device that all user information associated with the digital content display opportunity identifier is deleted (e.g., deletion receipt).

Modifications, additions, or omissions may be made to method 1100 of FIG. 11. Additionally, one or more steps in the method of FIG. 11 may be performed in parallel or in any suitable order.

Figure 12:
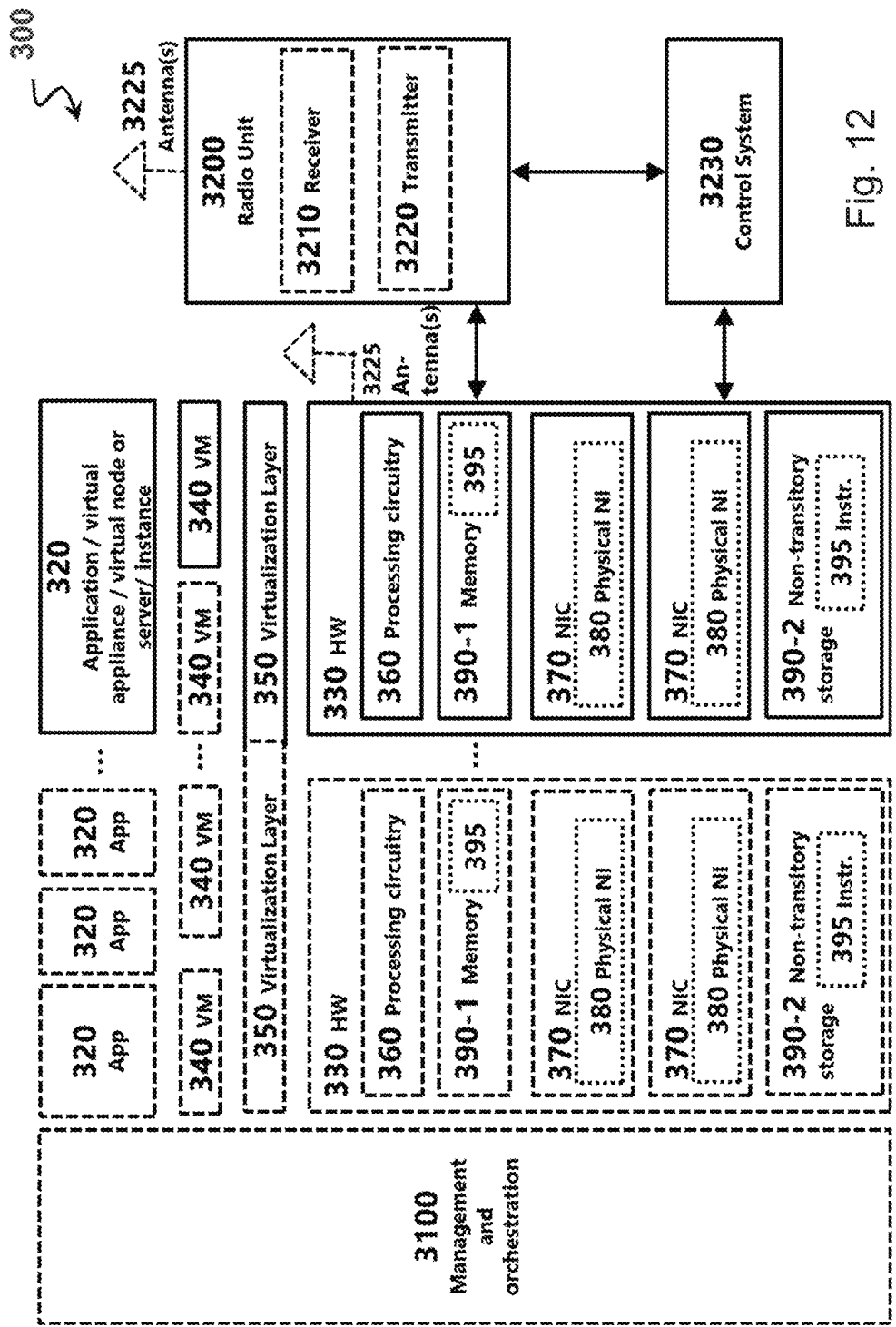
FIG. 12 illustrates an example virtualization environment, according to certain embodiments.

FIG. 12 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 12, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 12.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1AdID A one-time use unique identifier for digital advertising
3GPP 3rd Generation Partnership Project
5G 5th Generation
5GC 5th Generation Core
Ad-ID A unique identifier for devices capable of showing digital advertising
CDMA Code Division Multiplexing Access
CN Core Network
DSP Demand Side Platform
eNB E-UTRAN NodeB
ePDCCH enhanced Physical Downlink Control Channel
EPS Evolved Packet System
E-SMLC evolved Serving Mobile Location Center
E-UTRA Evolved UTRA
E-UTRAN Evolved UTRAN
FDD Frequency Division Duplex GERAN GSM EDGE Radio Access Network
gNB Base station in NR
GNSS Global Navigation Satellite System
GSM Global System for Mobile communication
ID Identity/Identifier
IAB Interactive Advertising Bureau
IoT Internet-of-Things
LTE Long-Term Evolution
MSC Mobile Switching Center
NGC Next Generation Core
NG-RAN Next Generation RAN
NR New Radio
PCell Primary Cell
PDSCH Physical Downlink Shared Channel
PLMN Public Land Mobile Network
RAN Radio Access Network
RAT Radio Access Technology
RNC Radio Network Controller
RTB Real-Time Bidding
SAE System Architecture Evolution
SCell Secondary Cell
SNR Signal to Noise Ratio
SSP Supply Side Platform
TDD Time Division Duplex
TTI Transmission Time Interval
UE User Equipment
UMTS Universal Mobile Telecommunication System
UTRA Universal Terrestrial Radio Access
UTRAN Universal Terrestrial Radio Access Network
WCDMA Wide CDMA
WLAN Wide Local Area Network
XR Extended Reality

The invention claimed is:

1. A method performed by an end user electronic device, the method comprising:
    detecting an event comprising detecting a dynamic geo-fence uniquely defined for the end user electronic device, wherein a digital content display opportunity is present within the dynamic geo-fence, the dynamic geo-fence is defined by an area around the end user electronic device, wherein the area of the dynamic geo-fence is defined depending on a situation comprising the end user electronic device being indoors or outdoors;
    in response to detecting the event:
        triggering the digital content display opportunity for a content to be displayed on the end user electronic device;
        identifying external sensors, each within the detected dynamic geo-fence and further within a respective detection range from the end user electronic device, the external sensors that come into the dynamic geo-fence are updated as the end user electronic device travels within a space;
        enabling communication with the external sensors;
        receiving environmental information from the external sensors, the environmental information comprises information about an environment around the end user electronic device, wherein other environmental information from another sensor within another geo-fence is excluded even when the other sensor is closer to the end user electronic device than the identified external sensors;
        generating an opportunity identifier that uniquely identifies the digital content display opportunity within a digital content display opportunity bidding system;
        obtaining demographic information associated with a user of the end user electronic device; and
        transmitting the opportunity identifier, the environmental information, and the demographic information to a network node in the digital content display opportunity bidding system.

2. The method of claim 1, wherein the digital content display opportunity is on the end user electronic device.

3. An end user electronic device comprising processing circuitry operable to:
    detect an event comprising detecting a dynamic geo-fence uniquely defined for the end user electronic device, wherein a digital content display opportunity is present within the dynamic geo-fence, the dynamic geo-fence is defined by an area around the end user electronic device, wherein the area of the dynamic geo-fence is defined depending on a situation comprising the end user electronic device being indoors or outdoors;
    in response to detecting the event:
        trigger the digital content display opportunity for a content to be displayed on the end user electronic device;
        identify external sensors each within the detected dynamic geo-fence and further within a respective detection range from the end user electronic device, the external sensors that come into the dynamic geo-fence are updated as the end user electronic device travels within a space;
        enable communication with the external sensors;
        receive environmental information from the external sensors, the environmental information comprises information about an environment around the end user electronic device, wherein other environmental information from another sensor within another geo-fence is excluded even when the other sensor is closer to the end user electronic device than the identified external sensors;
        generate an opportunity identifier that uniquely identifies the digital content display opportunity within a digital content display opportunity bidding system;
        obtain demographic information associated with a user of the end user electronic device; and
        transmit the opportunity identifier, the environmental information, and the demographic information to a network node in the digital content display opportunity bidding system.

4. The end user electronic device of claim 3, the processing circuitry further operable to receive an indication from the network node that the network node has deleted all user information associated with the opportunity identifier.

5. The end user electronic device of claim 3, the processing circuitry further operable to receive digital content for display at the end user electronic device, wherein the digital content is associated with the opportunity identifier.

6. The end user electronic device of claim 3, wherein the processing circuitry is operable to trigger the digital content display opportunity by accessing an application or a website via the end user electronic device.

7. The end user electronic device of claim 3, wherein the processing circuitry is operable to trigger the digital content display opportunity by the end user electronic device being physically located at a particular geographic location.

8. The end user electronic device of claim 3, wherein the environmental information includes one or more of positioning information, orientation information, biometric information, weather information, light-level information, and sound-level information.

9. The end user electronic device of claim 3, the processing circuitry further operable to:
assign the audience identifier to the opportunity identifier, wherein the assigned audience identifier is based on at least one of the environmental information and the demographic information; and
transmit the audience identifier to the network node in the digital content display opportunity bidding system.

10. The end user electronic device of claim 3, wherein the digital content display opportunity comprises an advertising opportunity, the opportunity identifier comprises an advertising identifier, and the network node comprises a real time bidding network node.

11. A method performed by a network node in a digital content display opportunity bidding system, the method comprising:
receiving, from a set of devices including an end user electronic device, a digital content display opportunity identifier and environmental information associated with the end user electronic device, wherein receiving the digital content display opportunity identifier and the environmental information is in response to:
a dynamic geo-fence uniquely defined for the end user electronic device being detected, wherein the digital content display opportunity is present within the dynamic geo-fence, the dynamic geo-fence is defined by an area around the end user electronic device, wherein the area of the dynamic geo-fence is defined depending on a situation comprising the end user electronic device being indoors or outdoors;
the digital content display opportunity identifier being triggered for a content to be displayed on the end user electronic device;
external sensors each within the detected dynamic geo-fence and further within a respective detection range from the end user electronic device being identified, the external sensors that come into the dynamic geo-fence are updated as the end user electronic device travels within a space;
communication between the end user electronic device and the external sensors being enabled;
environmental information being received from the external sensors, the environmental information comprises information about an environment around the end user electronic device, wherein other environmental information from another sensor within another geo-fence is excluded even when the other sensor is closer to the end user electronic device than the identified external sensors; and
the digital content display opportunity identifier being generated, the digital content display opportunity identifier uniquely identifying the digital content display opportunity;
assigning an audience identifier to the digital content display opportunity identifier; and
transmitting a bid request, the bid request comprising the digital content display opportunity identifier and the audience identifier.

12. A network node in a digital content display opportunity bidding system, the network node comprising processing circuitry operable to:
receive, from a set of devices including an end user electronic device, a digital content display opportunity identifier and environmental information associated with the end user electronic device, wherein receiving the digital content display opportunity identifier and the environmental information is in response to;
a dynamic geo-fence uniquely defined for the end user electronic device being detected, wherein the digital content display opportunity is present within the dynamic geo-fence, the dynamic geo-fence is defined by an area around the end user electronic device, wherein the area of the dynamic geo-fence is defined depending on a situation comprising the end user electronic device being indoors or outdoors;
the digital content display opportunity identifier being triggered for a content to be displayed on the end user electronic device;
external sensors each within the detected dynamic geo-fence and further within a respective detection range from the end user electronic device being identified, the external sensors that come into the dynamic geo-fence are updated as the end user electronic device travels within a space;
communication between the end user electronic device and the external sensors being enabled;
environmental information being received from the external sensors, the environmental information comprises information about an environment around the end user electronic device, wherein other environmental information from another sensor within another geo-fence is excluded even when the other sensor is closer to the end user electronic device than the identified external sensors; and
the digital content display opportunity identifier being generated, the digital content display opportunity identifier uniquely identifying the digital content display opportunity;
assigning an audience identifier to the digital content display opportunity identifier; and
transmitting a bid request, the bid request comprising the digital content display opportunity identifier and the audience identifier.

13. The network node of claim 12, the processing circuitry further operable to receive, from the end user electronic device, demographic information associated with a user of the end user electronic device, and wherein the assigned audience identifier is further based on the demographic information.

14. The network node of claim 12, the processing circuitry further operable to:
deleting all user information associated with the digital content display opportunity identifier; and
transmit an indication to the end user electronic device that all user information associated with the digital content display opportunity identifier is deleted.

15. The network node of claim 12, wherein the digital content display opportunity identifier is received from the end user electronic device.

16. The network node of claim 12, wherein the environmental information includes one or more of positioning information, orientation information, biometric information, weather information, light-level information, and sound-level information.

17. The network node of claim 12, wherein an elapsed time from receiving the digital content display opportunity identifier and assigning the audience identifier is less than 200 milliseconds.

18. The network node of claim 12, wherein the digital content display opportunity identifier comprises an advertising identifier, and the network node comprises a real time bidding network node.

19. The network node of claim 12, wherein the processing circuitry is operable to transmit the bid request using an OpenRTB application programming interface (API).

* * * * *